United States Patent
Chen et al.

(10) Patent No.: US 10,334,095 B2
(45) Date of Patent: Jun. 25, 2019

(54) METHOD FOR SWITCHING OFF COMMUNICATION SCREEN TO AVOID FALSE TRIGGERING BASED ON MOBILE TERMINAL AND SYSTEM EMPLOYING THE SAME

(71) Applicant: HuiZhou TCL Mobile Communication Co., Ltd., HuiZhou (CN)

(72) Inventors: Jianqiang Chen, Guangdong (CN); Feifei Chai, Guangdong (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 227 days.

(21) Appl. No.: 14/901,080

(22) PCT Filed: Mar. 9, 2015

(86) PCT No.: PCT/CN2015/073886
§ 371 (c)(1),
(2) Date: Dec. 28, 2015

(87) PCT Pub. No.: WO2016/074386
PCT Pub. Date: May 19, 2016

(65) Prior Publication Data
US 2016/0301799 A1   Oct. 13, 2016

(30) Foreign Application Priority Data
Nov. 14, 2014 (CN) .......................... 2014 1 0644713

(51) Int. Cl.
*G06F 3/0488* (2013.01)
*H04M 1/725* (2006.01)
(Continued)

(52) U.S. Cl.
CPC ...... *H04M 1/72577* (2013.01); *G06F 1/3262* (2013.01); *G06F 1/3265* (2013.01);
(Continued)

(58) Field of Classification Search
CPC . G06F 3/00; G06F 3/041; G06F 3/048; G06F 3/0481; G06F 3/0484;
(Continued)

(56) References Cited

U.S. PATENT DOCUMENTS

2005/0079896 A1*  4/2005  Kokko ................. G06F 3/0488
                                                       455/566
2008/0070648 A1*  3/2008  Kang ................... H04M 1/0214
                                                       455/575.3
(Continued)

FOREIGN PATENT DOCUMENTS

CN        10442587       5/2009
CN        101442587      5/2009
(Continued)

OTHER PUBLICATIONS

CN101442587 Machine Translation.*
CN 103002148 Machine Translation.*

*Primary Examiner* — Xiomara L Bautista

(57) ABSTRACT

A method for switching off communication screen to avoid false triggering based on a mobile terminal and system employing the same are described. The method comprises: controlling the mobile terminal to switch off the touch-screen and enter a communication gesture mode when the mobile terminal is detected to be in the communication mode and there is no touch operation in the mobile terminal during a predetermined interval; and acquiring a gesture operation instruction of a user and controlling the mobile terminal to perform a plurality of corresponding operations based on a preconfigured gesture operation instruction. The
(Continued)

present invention switches off the communication screen to avoid false triggering.

6 Claims, 2 Drawing Sheets

(51) Int. Cl.
*G06F 3/041* (2006.01)
*G06F 3/0484* (2013.01)
*H04W 4/14* (2009.01)
*H04M 1/67* (2006.01)
*G06F 1/3234* (2019.01)

(52) U.S. Cl.
CPC .......... *G06F 3/0416* (2013.01); *G06F 3/0484* (2013.01); *G06F 3/0488* (2013.01); *G06F 3/04883* (2013.01); *H04M 1/67* (2013.01); *H04W 4/14* (2013.01); *H04M 1/72569* (2013.01); *H04M 1/72583* (2013.01); *H04M 2250/22* (2013.01); *Y02D 10/153* (2018.01)

(58) Field of Classification Search
CPC .... G06F 3/0488; G06F 3/04883; H04W 4/14; H04M 1/725; H04M 1/72577; H04M 1/72583
See application file for complete search history.

(56) References Cited

U.S. PATENT DOCUMENTS

| | | | | |
|---|---|---|---|---|
| 2008/0220752 | A1* | 9/2008 | Forstall | H04M 1/56 455/415 |
| 2009/0007017 | A1* | 1/2009 | Anzures | G06F 3/04883 715/835 |
| 2009/0295743 | A1* | 12/2009 | Nakajoh | G06F 3/04883 345/173 |
| 2010/0257490 | A1* | 10/2010 | Lyon | G06F 3/0488 715/863 |
| 2012/0218196 | A1* | 8/2012 | Lv | G06F 3/0416 345/173 |
| 2013/0111091 | A1* | 5/2013 | Chun | G06F 9/4443 710/266 |
| 2014/0063175 | A1* | 3/2014 | Jafry | H04M 1/67 348/14.02 |
| 2014/0123078 | A1* | 5/2014 | Brinda | G06F 21/36 715/863 |
| 2014/0125606 | A1* | 5/2014 | Namkung | G06F 1/1656 345/173 |
| 2014/0370938 | A1* | 12/2014 | Lee | H04M 1/72583 455/566 |
| 2015/0135328 | A1* | 5/2015 | Ellis | G06Q 10/10 726/26 |
| 2016/0150399 | A1* | 5/2016 | Zhang | H04W 8/22 455/418 |
| 2017/0109011 | A1* | 4/2017 | Jiang | G06F 3/04817 |
| 2017/0195473 | A1* | 7/2017 | Yun | H04M 1/72519 |

FOREIGN PATENT DOCUMENTS

| | | |
|---|---|---|
| CN | 102769689 | 11/2012 |
| CN | 102833389 | 12/2012 |
| CN | 102929526 | 2/2013 |
| CN | 102970437 | 3/2013 |
| CN | 103002148 | 3/2013 |
| CN | 103345360 | 10/2013 |
| CN | 103581418 | 2/2014 |
| CN | 104391645 | 3/2015 |

* cited by examiner

METHOD FOR SWITCHING OFF COMMUNICATION SCREEN TO AVOID FALSE TRIGGERING BASED ON MOBILE TERMINAL AND SYSTEM EMPLOYING THE SAME

RELATED APPLICATIONS

This application is a National Phase of PCT Patent Application No. PCT/CN2015/073886 having International filing date of Mar. 9, 2015, which claims the benefit of priority of Chinese Patent Application No. 201410644713.1 filed on Nov. 14, 2014. The contents of the above applications are all incorporated by reference as if fully set forth herein in their entirety.

FIELD AND BACKGROUND OF THE INVENTION

Field of Invention

The present invention relates to a technical field of a mobile terminal, and more particularly to a method for switching off communication screen to avoid false triggering based on a mobile terminal and system employing the same.

Description of Prior Art

With the development of mobile communication and increase of the level of living of the population, a variety of mobile terminals, such as mobile phone, are increasingly used. The mobile phones have become indispensable communication tools of the daily life of the people.

Conventionally, due to the growing variety of the functions of the mobile phones, the operation of making telephone call is the most basic function of the mobile terminal and it is one of the most frequently used functions. While the user has a phone attach to his ear for making a telephone call, the user cannot see the screen of the mobile terminal.

Accompanying with the large number of applications of the touch screen of the mobile phone, the user's face attaches to the touch screen of the mobile phone during the call, which result in the problem of the operating error, e.g. an operation of hanging up the phone. In order to solve the problem, the mobile phone in the market utilizes a proximity sensor. However, not only does this increase the cost of the mobile phone, it also places greater strain on the circuit board trace at the top of the mobile phone.

Consequently, there is a need to improve the conventional techniques and develop a novel manner.

SUMMARY OF THE INVENTION

Based on the above-mentioned drawbacks, one objective of the present invention is to provide a method for switching off communication screen to avoid false triggering based on a mobile terminal and system employing the same in order to solve the problems above. The present invention sets forth a method for switching off communication screen to avoid false triggering based on a mobile terminal and system employing the same. The present invention implement a method for switching off communication screen to avoid false triggering by combining the of touch-screen's self-building with the CPU's communication interaction, which performs the same function of the P-sensor, in order to provide the convenience and reduce costs.

For the above-mentioned objective, the present invention employs the following technical schemes.

A method for switching off communication screen to avoid false triggering based on a mobile terminal, the method comprising the step of:

detecting whether the mobile terminal enters a communication mode;

controlling a touch-screen to enter a touchable normal mode when the mobile terminal does not enter the communication mode;

detecting whether a touch operation is performed on the touch screen of the mobile terminal during a predetermined interval again when the mobile terminal is detected to be in the communication mode;

controlling the mobile terminal to switch off the touch-screen and enter a communication gesture mode if there is no touch operation in the mobile terminal during the predetermined interval; and acquiring a gesture operation instruction of a user and controlling the mobile terminal to perform a plurality of corresponding operations based on a preconfigured gesture operation instruction when the touch-screen is detected to enter the communication gesture mode.

Preferably, before the step of detecting whether the mobile terminal enters the communication mode, the method further comprises a step of: configuring a plurality of communication gesture modes, which are operated by a plurality of gestures, in the mobile terminal in advance wherein a plurality of gesture operation instructions are configured as one-to-one correspondence with the communication gesture modes.

Preferably, the gesture operation instructions configured as one-to-one correspondence with the communication gesture modes comprises:

a gesture for swiping right to correspondingly control an operation of a short message interface popup;

a gesture for swiping left to correspondingly control an operation of a communication list interface popup;

a gesture for swiping up to correspondingly control an interface popup of a dialing operation; and a gesture for swiping down to correspondingly control an interface popup of hanging up the phone.

Preferably, during the step of acquiring the gesture operation instruction of the user and controlling the mobile terminal to perform the corresponding operations based on the preconfigured gesture operation instruction when the touch-screen is detected to enter the communication gesture mode, the method further comprises the steps of:

acquiring the gesture operation instruction of the user when the touch-screen is detected to enter the communication gesture mode;

controlling the mobile terminal to hang up a phone and displaying an interface of hanging up the phone when a gesture operation acquired from the user is swiped down;

controlling the mobile terminal to enter a dialing interface when the gesture operation acquired from the user is swiped up;

controlling the mobile terminal to enter a communication list interface when the gesture operation acquired from the user is swiped left; and controlling the mobile terminal to enter a short message interface when the gesture operation acquired from the user is swiped right.

A method for switching off communication screen to avoid false triggering based on a mobile terminal, the method comprising the step of:

detecting whether the mobile terminal enters a communication mode;

controlling the mobile terminal to switch off the touch-screen and enter a communication gesture mode when the mobile terminal is detected to be in the communication mode and there is no touch operation in the mobile terminal during a predetermined interval; and acquiring a gesture operation instruction of a user and controlling the mobile terminal to perform a plurality of corresponding operations based on a preconfigured gesture operation instruction when the touch-screen is detected to enter the communication gesture mode.

Preferably, before the step of detecting whether the mobile terminal enters the communication mode, the method further comprises a step of: configuring a plurality of communication gesture modes, which are operated by a plurality of gestures, in the mobile terminal in advance wherein a plurality of gesture operation instructions are configured as one-to-one correspondence with the communication gesture modes.

Preferably, the gesture operation instructions configured as one-to-one correspondence with the communication gesture modes comprises:

a gesture for swiping right to correspondingly control an operation of a short message interface popup;

a gesture for swiping left to correspondingly control an operation of a communication list interface popup;

a gesture for swiping up to correspondingly control an interface popup of a dialing operation; and a gesture for swiping down to correspondingly control an interface popup of hanging up the phone.

Preferably, the method further comprises a step of: controlling the touch-screen to enter a touchable normal mode when the mobile terminal does not enter the communication mode.

Preferably, during the step of controlling the mobile terminal to switch off the touch-screen and enter a communication gesture mode when the mobile terminal is detected to be in the communication mode and there is no touch operation in the mobile terminal during a predetermined interval, the method further comprises the steps of: detecting whether the touch operation is performed on the touch screen of the mobile terminal during the predetermined interval again when the mobile terminal is detected to be in the communication mode; and controlling the mobile terminal to switch off the touch-screen and enter the communication gesture mode if there is no touch operation in the mobile terminal during the predetermined interval.

Preferably, during the step of acquiring the gesture operation instruction of the user and controlling the mobile terminal to perform the corresponding operations based on the preconfigured gesture operation instruction when the touch-screen is detected to enter the communication gesture mode, the method further comprises the steps of:

acquiring the gesture operation instruction of the user when the touch-screen is detected to enter the communication gesture mode;

controlling the mobile terminal to hang up a phone and displaying an interface of hanging up the phone when a gesture operation acquired from the user is swiped down;

controlling the mobile terminal to enter a dialing interface when the gesture operation acquired from the user is swiped up;

controlling the mobile terminal to enter a communication list interface when the gesture operation acquired from the user is swiped left; and controlling the mobile terminal to enter a short message interface when the gesture operation acquired from the user is swiped right.

A system for switching off communication screen to avoid false triggering based on a mobile terminal, the system comprises:

a preconfigured module, for configuring a plurality of communication gesture modes, which are operated by a plurality of gestures, in the mobile terminal in advance wherein a plurality of gesture operation instructions are configured as one-to-one correspondence with the communication gesture modes;

a communication-detecting module, for detecting whether the mobile terminal enters a communication mode;

a detecting and mode-switching module, for controlling the mobile terminal to switch off the touch-screen and enter a communication gesture mode when the mobile terminal is detected to be in the communication mode and there is no touch operation in the mobile terminal during a predetermined interval; and a gesture operation control module, for acquiring a gesture operation instruction of a user and controlling the mobile terminal to perform a plurality of corresponding operations based on a preconfigured gesture operation instruction when the touch-screen is detected to enter the communication gesture mode.

Preferably, the detecting and mode-switching module further comprises:

a first detecting unit, for detecting whether the touch operation is performed on the touch screen of the mobile terminal during the predetermined interval when the mobile terminal is in the communication mode; and a first control unit, for controlling the mobile terminal so as to switch off the touch-screen to enter the communication gesture mode if there is no touch operation in the mobile terminal during the predetermined interval.

Preferably, the gesture operation control module further comprises:

a second detecting unit, for acquiring a gesture operation instruction of the user when there is a communication gesture mode detected in the touch-screen;

a first gesture operation control unit, for controlling the mobile terminal to hang up a phone and displaying the interface of hanging up the phone when the gesture operation acquired from the user is swiped down;

a second gesture operation control unit, for controlling the mobile terminal to enter a dialing interface when the gesture operation acquired from the user is swiped up;

a third gesture operation control unit, for controlling the mobile terminal to enter a communication list interface when the gesture operation acquired from the user is swiped left; and a fourth gesture operation control unit, for controlling the mobile terminal to enter a short message interface when the gesture operation acquired from the user is swiped right, as described above.

Preferably, the system further comprises: a normal mode control module, for controlling the touch-screen to enter a touchable normal mode when the mobile terminal does not enter the communication mode; and the gesture operation instructions configured one-to-one correspondence with the communication gesture modes comprises: a gesture for swiping right to correspondingly control an operation of a short message interface popup; a gesture for swiping left to correspondingly control an operation of a communication list interface popup; a gesture for swiping up to correspondingly control an interface popup of a dialing operation; and a gesture for swiping down to correspondingly control an interface popup of hanging up the phone.

DESCRIPTION OF SPECIFIC EMBODIMENTS OF THE INVENTION

The following embodiments refer to the accompanying drawings for exemplifying specific implementable embodiments of the present invention. It should be noted that the exemplary described embodiments are used to describe and understand the present invention, but the present invention is not limited thereto.

Figure 1:
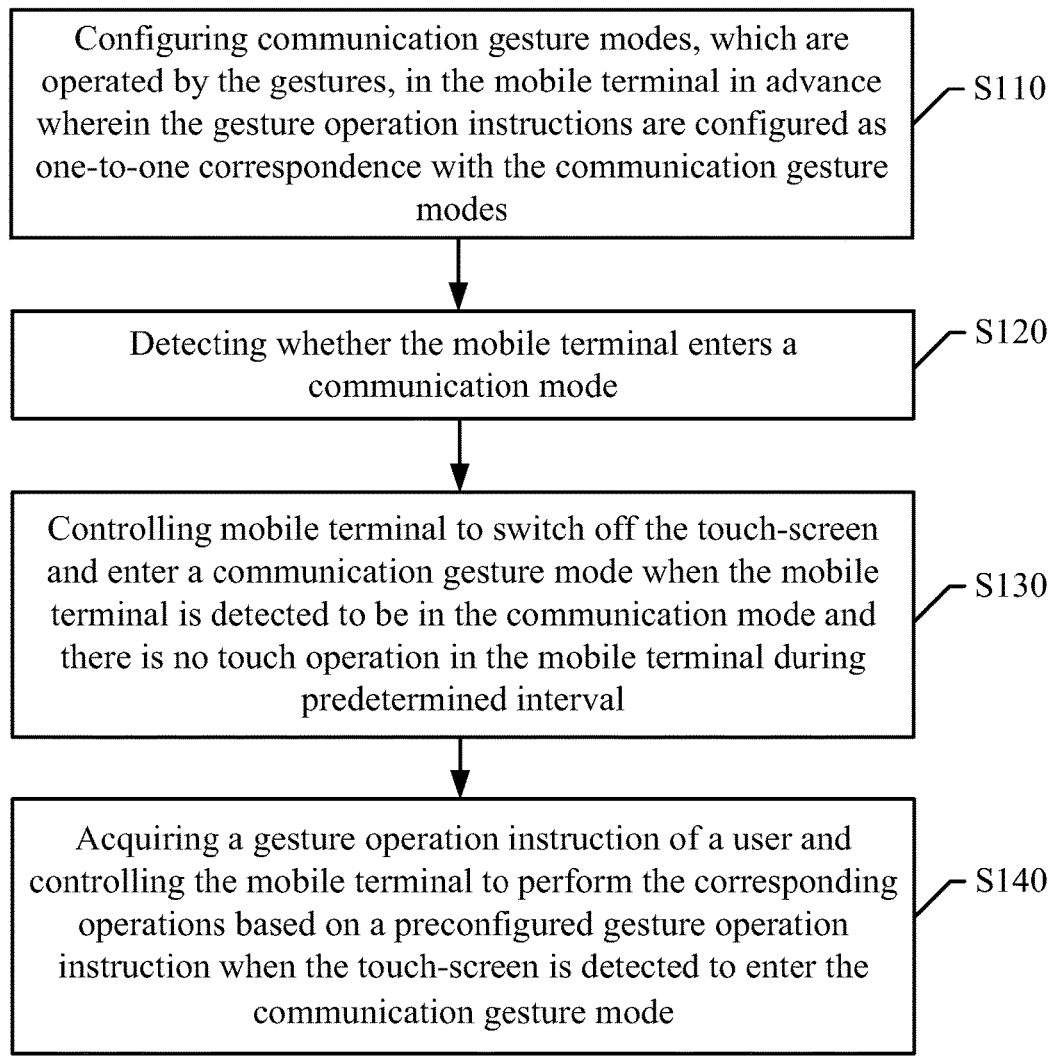
FIG. 1 is a flow chart of a method for switching off communication screen to avoid false triggering based on a mobile terminal according to one preferred embodiment of the present invention.

Please refer to FIG. 1, which is a flow chart of a method for switching off communication screen to avoid false triggering based on a mobile terminal according to one preferred embodiment of the present invention. As shown in the FIG. 1, the method for switching off communication screen to avoid false triggering based on a mobile terminal comprises the following steps.

In step S110, a plurality of communication gesture modes are configured in the mobile terminal in advance wherein the communication gesture modes are operated by the gestures. Furthermore, a plurality of gesture operation instructions configures one-to-one correspondence with the communication gesture modes.

In the embodiment of the present invention, it is required to configure a plurality of communication gesture modes, which are operated by the different gestures, in the mobile terminal in advance. When the mobile terminal is triggered to enter the communication gesture mode, the touch-screen switches off the touch function.

In the present invention, it is necessary to set one-to-one correspondence between the gesture operation instructions and the communication gesture modes wherein the gesture operation instructions corresponding to the communication gesture modes comprises: a gesture for swiping right to correspondingly control an operation of a short message interface popup, a gesture for swiping left to correspondingly control an operation of a communication list interface popup, a gesture for swiping up to correspondingly control an interface popup of a dialing operation, and a gesture for swiping down to correspondingly control an interface popup of hanging up the phone. Certainly, the gesture operation instructions which are set as one-to-one correspondence with the communication gesture modes are not limited thereto and further comprise more corresponding gesture operation instructions.

In step S120, the mobile terminal is detected to determine whether the mobile terminal enters a communication mode.

After the gesture operation instructions corresponding to the communication gesture modes in the present invention are set up, a real-time detection to the mobile terminal is performed to check whether the mobile terminal enters the communication mode. When the mobile terminal does not enter the communication mode, the mobile terminal controls the touch-screen to enter a touchable normal mode. In one case, when the central processing unit (CPU) checks that the mobile terminal does not enter the communication mode, the mobile terminal controls the touch-screen to enter the normal mode so that the user is capable of normally performing the click and swiping operations.

In step S130, when the mobile terminal is detected as a communication mode and there is no touch operation in the mobile terminal during a predetermined interval, the mobile terminal is controlled to switch off the touch-screen to enter the communication gesture mode.

In other words, when the mobile terminal is in the communication mode, the mobile terminal detects whether a touch operation is performed on the touch screen of the mobile terminal during the predetermined interval. If there is no touch operation in the mobile terminal during a predetermined interval (e.g. two seconds), the mobile terminal is controlled to switch off the touch-screen to enter the communication gesture mode.

For example, when the mobile terminal enters the communication gesture mode, the CPU switches off the LCD and notifies the touch-screen of entering the communication gesture mode if there is no clicking and swiping operation after the N seconds during the communication mode.

In step S140, when there is a communication gesture mode detected in the touch-screen, a gesture operation instruction of the user is acquired and the mobile terminal is controlled to perform the corresponding operations based on the preconfigured gesture operation instruction.

In the embodiments of the present invention, when the mobile terminal goes into the communication gesture mode, the touch-screen is capable of accepting different gesture operations, such as a swiping up operation, a swiping down operation, a swiping left operation, a swiping right operation, and "LX" pattern.

When there is a communication gesture mode detected in the touch-screen, a gesture operation instruction is acquired and the mobile terminal is controlled to perform the corresponding operations based on the preconfigured gesture operation instruction. For example, when there is a communication gesture mode detected in the touch-screen, a gesture operation instruction is acquired by the mobile terminal. When the gesture operation acquired from the user is swiped down, the mobile terminal hangs up the phone and displays the interface of hanging up the phone. When the gesture operation acquired from the user is swiped up, the mobile terminal enters a dialing interface. When the gesture operation acquired from the user is swiped left, the mobile terminal enters a communication list interface. When the gesture operation acquired from the user is swiped right, the mobile terminal enters a short message interface.

The communication gesture mode of the present invention only is enabled in the communication mode and the CPU orders the touch-screen by way of the I²C bus for entering the communication gesture mode. When there is no operation after some time during the communication mode, the touch-screen notifies the CPU to switch off the LCD and the touch-screen maintains in the communication gesture mode.

When a gesture is swiped up, down, left or right by the user on a black screen, the touch-screen notifies the CPU to order the LCD for entering the different mode screens. If the touch-screen is in the communication gesture mode, the CPU ignore any click on the touch-screen and only identifies thee specific gestures, e.g. swiping, down, left or right, for entering the specific screens. For example, when the touch-screen receives a swiping down gesture, the CPU is notified to hang up the phone and display the interface of hanging up the phone. When the touch-screen receives a swiping up gesture, the CPU is notified to enter a dialing interface. When the touch-screen receives a swiping left gesture, the CPU is notified to enter a communication list interface. When the touch-screen receives a swiping left gesture, the CPU is notified to enter a short message interface.

Based on the above-mentioned descriptions, the present invention sets forth a method for easily switching off communication screen to avoid false triggering by combining the of touch-screen's self-building with the CPU's communication interaction to implement the method for switching off communication screen to avoid false triggering based on a mobile terminal and system employing the same, which performs the same function of the P-sensor, in order to provide the convenience and reduce costs.

Figure 2:
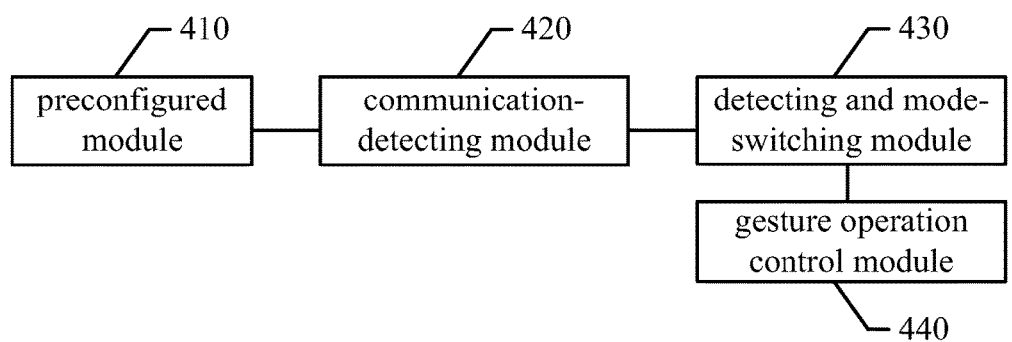
FIG. 2 is a schematic structural block diagram of a system for switching off communication screen to avoid false triggering based on a mobile terminal according to one preferred embodiment of the present invention.

According to the above embodiments, the present invention further sets forth a system for switching off communication screen to avoid false triggering based on a mobile terminal. As shown in FIG. 2, the system comprises:

a preconfigured module 410 is used in a plurality of communication gesture modes which are configured in the mobile terminal in advance wherein the communication gesture modes are operated by the gestures. Furthermore, a plurality of gesture operation instructions set one-to-one correspondence with the communication gesture modes, as described above;

a communication-detecting module 420 is used to detect whether the mobile terminal enters a communication mode, as described above;

a detecting and mode-switching module 430 is used to control the mobile terminal in order to switch off the touch-screen to enter the communication gesture mode when the mobile terminal is detected as a communication mode and there is no touch operation in the mobile terminal during a predetermined interval, as described above; and a gesture operation control module 440 is used to control the mobile terminal so as to perform the corresponding operations based on the preconfigured gesture operation instruction when there is a communication gesture mode detected in the touch-screen to acquire a gesture operation instruction of the user, as described above.

Furthermore, in the system for switching off communication screen to avoid false triggering based on a mobile terminal, wherein the detecting and mode-switching module 430 further comprises:

a first detecting unit is used to detect whether a touch operation is performed on the touch screen of the mobile terminal during the predetermined interval when the mobile terminal is in the communication mode, as described above.

a first control unit is used to control the mobile terminal so as to switch off the touch-screen to enter the communication gesture mode if there is no touch operation in the mobile terminal during a predetermined interval, as described above.

In the system for switching off communication screen to avoid false triggering based on a mobile terminal, wherein the gesture operation control module 440 further comprises:

a second detecting unit is used to acquire a gesture operation instruction of the user when there is a communication gesture mode detected in the touch-screen, as described above;

a first gesture operation control unit is used to control the mobile terminal to hang up the phone and display the interface of hanging up the phone when the gesture operation acquired from the user is swiped down, as described above;

a second gesture operation control unit is used to control the mobile terminal to enter a dialing interface when the gesture operation acquired from the user is swiped up, as described above;

a third gesture operation control unit is used to control the mobile terminal to enter a communication list interface when the gesture operation acquired from the user is swiped left, as described above; and a fourth gesture operation control unit is used to control the mobile terminal to enter a short message interface when the gesture operation acquired from the user is swiped right, as described above.

The system for switching off communication screen to avoid false triggering based on a mobile terminal further comprises:

a normal mode control module is used to control the touch-screen to enter a touchable normal mode when the mobile terminal does not enter the communication mode, as described above.

The gesture operation instructions configured one-to-one correspondence with the communication gesture modes comprises:

a gesture for swiping right to correspondingly control an operation of a short message interface popup;

a gesture for swiping left to correspondingly control an operation of a communication list interface popup;

a gesture for swiping up to correspondingly control an interface popup of a dialing operation; and a gesture for swiping down to correspondingly control an interface popup of hanging up the phone.

According to the aforementioned descriptions, the present invention provides a method for switching off communication screen to avoid false triggering based on a mobile terminal and system employing the same. The following manners are adopted: the mobile terminal is detected to determine whether the mobile terminal enters a communication mode; the mobile terminal is controlled to switch off the touch-screen to enter the communication gesture mode when the mobile terminal is detected as a communication mode and there is no touch operation in the mobile terminal during a predetermined interval; a gesture operation instruction of the user is acquired and the mobile terminal is controlled to perform the corresponding operations based on the preconfigured gesture operation instruction when there is a communication gesture mode detected in the touch-screen. The present invention makes full use of the communication gesture modes of the touch-screen to normally perform the communication mode without the proximity sensor. There is no false triggering on the touch-screen during the communication mode to replace the proximity sensor for reducing the costs and the communication gesture modes are used to enter the different interfaces for convenient operation to the user.

As is understood by a person skilled in the art, the foregoing preferred embodiments of the present invention are illustrative rather than limiting of the present invention. It is intended that they cover various modifications and similar arrangements be included within the spirit and scope of the present invention, the scope of which should be accorded the broadest interpretation so as to encompass all such modifications and similar structures.

What is claimed is:

1. A method for switching off communication screen to avoid false triggering based on a mobile terminal, the method comprising:

detecting whether the mobile terminal enters a communication status;

controlling a touch-screen to enter a touchable normal mode when the mobile terminal does not enter the communication status;

detecting whether a touch operation is performed on the touch screen of the mobile terminal during a predetermined interval again when the mobile terminal is detected to be in the communication status;

controlling the mobile terminal to switch off the touch-screen and enter a communication gesture mode if there is no touch operation in the mobile terminal during the predetermined interval; and acquiring a gesture operation instruction of a user and controlling the mobile terminal to perform a plurality of corresponding operations based on a preconfigured gesture operation instruction when the touch-screen is detected to enter the communication gesture mode;

wherein the preconfigured gesture operation instruction comprises:

a gesture for swiping right to correspondingly control operation of a short message interface popup of the mobile terminal;

a gesture for swiping left to correspondingly control operation of a communication list interface popup of the mobile terminal;

a gesture for swiping up to correspondingly control an interface popup of dialing operation of the mobile terminal; and a gesture for swiping down to correspondingly control an interface popup of hanging up a phone call of the mobile terminal.

2. The method for switching off communication screen to avoid false triggering based on the mobile terminal of claim 1, during the step of acquiring the gesture operation instruction of the user and controlling the mobile terminal to perform the corresponding operations based on the preconfigured gesture operation instruction when the touch-screen is detected to enter the communication gesture mode, further comprising the steps of:

acquiring the gesture operation instruction of the user when the touch-screen is detected to enter the communication gesture mode;

controlling the mobile terminal to hang up a phone and displaying an interface of hanging up the phone when a gesture operation acquired from the user is swiped down;

controlling the mobile terminal to enter a dialing interface when the gesture operation acquired from the user is swiped up;

controlling the mobile terminal to enter a communication list interface when the gesture operation acquired from the user is swiped left; and controlling the mobile terminal to enter a short message interface when the gesture operation acquired from the user is swiped right.

3. A method for switching off communication screen to avoid false triggering based on a mobile terminal, the method comprising:

detecting whether the mobile terminal enters a communication status;

controlling the mobile terminal to switch off the touch-screen and enter a communication gesture mode when the mobile terminal is detected to be in the communication status and there is no touch operation in the mobile terminal during a predetermined interval; and acquiring a gesture operation instruction of a user and controlling the mobile terminal to perform a plurality of corresponding operations based on a preconfigured gesture operation instruction when the touch-screen is detected to enter the communication gesture mode; and wherein the gesture operation instruction comprises:

a gesture for swiping right to correspondingly control operation of a short message interface popup of the mobile terminal;

a gesture for swiping left to correspondingly control operation of a communication list interface popup of the mobile terminal;

a gesture for swiping up to correspondingly control an interface popup of dialing operation of the mobile terminal; and a gesture for swiping down to correspondingly control an interface popup of hanging up the phone of the mobile terminal.

4. The method for switching off communication screen to avoid false triggering based on the mobile terminal of claim 3, further comprising a step of:

controlling the touch-screen to enter a touchable normal mode when the mobile terminal does not enter the communication status.

5. The method for switching off communication screen to avoid false triggering based on the mobile terminal of claim 3, during the step of controlling the mobile terminal to switch off the touch-screen and enter a communication gesture mode when the mobile terminal is detected to be in the communication status and there is no touch operation in the mobile terminal during a predetermined interval, further comprising the steps of:

detecting whether the touch operation is performed on the touch screen of the mobile terminal during the predetermined interval again when the mobile terminal is detected to be in the communication status; and controlling the mobile terminal to switch off the touch-screen and enter the communication gesture mode if there is no touch operation in the mobile terminal during the predetermined interval.

6. The method for switching off communication screen to avoid false triggering based on the mobile terminal of claim 3, during the step of acquiring the gesture operation instruction of the user and controlling the mobile terminal to perform the corresponding operations based on the preconfigured gesture operation instruction when the touch-screen is detected to enter the communication gesture mode, further comprising the steps of:

acquiring the gesture operation instruction of the user when the touch-screen is detected to enter the communication gesture mode;

controlling the mobile terminal to hang up a phone and displaying an interface of hanging up the phone when a gesture operation acquired from the user is swiped down;

controlling the mobile terminal to enter a dialing interface when the gesture operation acquired from the user is swiped up;

controlling the mobile terminal to enter a communication list interface when the gesture operation acquired from the user is swiped left; and controlling the mobile terminal to enter a short message interface when the gesture operation acquired from the user is swiped right.

* * * * *